United States Patent [19]

LaCasse

[11] Patent Number: 4,629,140
[45] Date of Patent: Dec. 16, 1986

[54] FILM REEL ASSEMBLY

[76] Inventor: Steven B. LaCasse, 36 Sherman Pl., Clifton, N.J. 07011

[21] Appl. No.: 784,398

[22] Filed: Oct. 4, 1985

Related U.S. Application Data

[63] Continuation of Ser. No. 668,610, Nov. 6, 1984, abandoned, which is a continuation of Ser. No. 549,692, Nov. 7, 1983, abandoned.

[51] Int. Cl.$^4$ ............................................. B65H 75/14
[52] U.S. Cl. .................................. 242/71.8; 242/68.3; 242/68.5; 242/74
[58] Field of Search ..................... 242/68.1, 68.3, 68.5, 242/71.8, 74, 118.4

[56] References Cited

U.S. PATENT DOCUMENTS

| | | | |
|---|---|---|---|
| 2,221,089 | 11/1940 | Githeus et al. | 242/68.3 |
| 3,132,821 | 5/1964 | Herden | 242/71.8 |
| 3,275,257 | 9/1966 | Cherniavskyj | 242/68.3 |
| 3,836,090 | 9/1974 | Mix | 242/68.5 |
| 3,837,690 | 9/1974 | Fraser, Jr. et al. | 285/319 |
| 3,905,561 | 9/1975 | Kelch et al. | 242/71.8 |
| 3,997,125 | 12/1976 | Sato | 242/68.5 |
| 4,293,102 | 10/1981 | Niles et al. | 242/71.8 |

FOREIGN PATENT DOCUMENTS 948363  2/1956  Fed. Rep. of Germany ........ 242/74

Primary Examiner—John M. Jillions
Attorney, Agent, or Firm—David A. Jackson

[57] ABSTRACT

A film reel assembly is disclosed which comprises parallel flanges with a cylindrical hollow hub disposed therebetween. The flanges define adjacent their axis of rotation a keyway within which a removable core member may be inserted, the core member defining a bore for the reception of an axis of rotation for the film reel. The core member has a specific cross-sectional configuration and the keyways define an identical and complementary configuration to accept the core member. The core member includes stop members located on one of its radiating arms that retains the core member in position within the keyway. The core member may be removed from the remainder of the film reel and replaced when it is too worn to be serviceable. A further feature of the film reel comprises an arcuate film-retaining slot disposed radially inward of the hub, with tapering periphery to frictionally engage the leading edge of the film strip as it is being initially threaded.

9 Claims, 5 Drawing Figures

FILM REEL ASSEMBLY

This is a continuation of application Ser. No. 668,610, filed Nov. 6, 1984, now abandoned, which is in turn a continuation of Ser. No. 549,692 filed Nov. 7, 1984, now abandoned.

BACKGROUND OF THE INVENTION

1. Field of the Invention:

The present invention relates generally to film reels for use with a variety of audio and video film strips, and particularly to film reels capable of being rebuilt for continued use.

2. Description of the Prior Art:

A variety of film reel constructions are available and in use for numerous audio, video and mixed media film and tape strips. Generally, and in the instance of audio-visual and video film reel constructions, such as the film reels used for microfilm storage for repeated use with film reading machines and the like, the reel defines a central cylindrical hub within which is journaled a specific keyway adapted to match the cross-sectional configuration of the driven axis of the film reading machine. This type of interaction is also common to most conventional movie film projectors, as well as certain professional video tape equipment. This type of construction assures positive engagement of the drive axis of the film display equipment, so that there is corresponding uniformity in the rate of travel of the film.

A characteristic of conventional film reels of this type is their limited useful life. The repeated mounting and dismounting of the film reel on the drive axis of the film displaying device has had one of two effects; in the instance where the film reel is of a durable metallic material, the repeated removal and mounting of the film reel has tended to damage both the drive axis and the keyway in the film reel, with the result that both the film reel and the drive axis must eventually be replaced.

In the instance where the film reel is prepared from a more resilient, plastic material, the repeated use results in the deterioration of the shape of the keyway in the film reel to the point where the film reel must be replaced. Of the two types of film reels employed, the replaceable plastic film reel has been preferred, as the increased frequency of reel deterioration and replacement is favorably outweighed by the reduction in maintenance of the drive components of the projection equipment.

Notwithstanding the desirability of utilizing plastic film reels over metal film reels, the persistant problem of film reel replacement remains unresolved. Despite their seemingly simple construction, film reels are a relatively costly item, so that replacement in the entirety of these film reels is economically undesirable.

So far as is known, previous film reel construction has always utilized a single or integrated film reel. A review of the prior art by the applicant herein uncovered only the following patents, none of which appear to relate to the area of present interest or correspondingly to afford a solution to the problem discussed hereinabove. The patents listed hereinafter comprise the closest prior art known at the time of the filing of the present application: U.S. Pat. No. 3,837,690 - Fraser, Jr. et al; U.S. Pat. No. 3,836,090 - Mix; U.S. Pat No. 3,997,125 - Sato; U.S. Pat No. 3,905,561 - Kelch et al; and, U.S. Pat. No. 4,293,102 - Niles et al.

None of the above listed is related to the specific film reel construction of interest to the present invention and, correspondingly, none of the patents deals with the problems and the solutions thereto disclosed hereinafter.

In view of the above, a need is believed to exist to construct a film reel having increasing useful life and corresponding decreased replacement cost.

SUMMARY OF THE INVENTION

In accordance with the present invention, a film reel assembly is disclosed which comprises generally parallel positioned, spaced-apart reel flanges, a cylindrical hollow hub extending between the flanges and having an axial slot for receiving an end of film therethrough, and a removable core member adapted to be positioned coaxially within the hub, and to be supported by and between the flanges. Each of the flanges defines a keyway for the frictional reception of the core member. The keyways are axially aligned with each other and have cross-sectional configurations identical and dimensionally complementary to that of the core member.

As a further feature of the invention, the core member is retained between and within the flanges by releasable, biasing stops that are located on a peripheral surface of the core member and are adapted to releasably engage the inboard axial edges of the keyways, to prevent axial displacement of the core member from the flanges and the hub area. Preferably, the stops are disposed in axial alignment with each other.

In a preferred embodiment, the core member comprises a generally cylindrical structure having four regularly spaced arms extending radially away from each other. All four arms are preferably defined by three perpendicularly disposed essentially rectangular, identically dimensioned flat faces. Three of the ridges are of identical size with a fourth larger dimensioned ridge. In this particular core construction, the stops are preferably disposed on the radial most flat face of one of the ridges adjacent the larger ridge.

A further feature of the film reel assembly of the present invention is a particular film strip retaining means defined by the flanges. The film retaining means comprises arcuate slots located in the flanges in axial alignment with each other and radially inward of the hub, each of the arcuate slots peripherally tapered to provide frictional engagement for the leading edge of the film strip. The arcuate slots are located adjacent the axial slot disposed in the hub, so that the film strip may be inserted through the latter and feed in either direction into engagement with one of the two peripheries of the arcuate slot. In a preferred construction, each of the arcuate slots subtends an arc of about 90° and is located with its arcuate medium most closely adjacent the axial slot.

The keyways defined by each of the flanges may comprise axially inward projecting collars that define an opening corresponding identically to the cross-sectional configuration of the core member. The collars extend interiorly toward each other and terminate at the interior lateral edges against which the stops located on the core member are adapted to abut when the core member is positioned within the film reel assembly.

Preferably, the film reel assembly is prepared with the flanges and the hub separately fabricated and thereafter glued to each other. Alternately, the flanges and hub may be molded integrally with each other, by injection molding or the like.

As an advantage of the present film reel assembly, the core member may be removed and replaced when unduly worn, while the remainder or bulk of the film reel assembly may be retained and continually used. The modular construction of the present film reel does not require the removal of the film from the spool during refitting of a new core member, as the stops on the core member may be accessed from openings in the flanges, and the core members may then be simply driven axially out of the film reel.

The film reel and the core member may be prepared from the same or differing materials, and preferably, the core member is prepared from a resilient and durable material such as reinforced nylon. The remainder of the film reel may be constructed from a variety of known synthetic thermoplastic materials all suitable for injection molding and sufficiently durable to withstand the stresses imposed on the storage and paying out of film.

Accordingly, it is a principal object of the present invention to provide a film reel assembly which is of reduced cost of manufacture and maintenance.

It is a further object of the present invention to provide a film reel assembly as aforesaid that facilitates repair and refurbishing thereof without the need for removal of the stored film.

It is a still further object of the present invention to provide a film reel assembly as aforesaid that offers an improved film feeding means for better retention of the film during initial winding on the film reel.

It is a still further object of the present invention to provide a film reel assembly as aforesaid that is of inexpensive constructin and improved ease of operation and repair.

Further objects and advantages will become apparent to those skilled in the art from a review of the ensuing description which proceeds with reference to the following illustrative drawings.

DETAILED DESCRIPTION

In accordance with the present invention, a film reel assembly is disclosed which comprises generally parallel, spaced apart reel flanges 2, 2', a cylindrical hollow hub 4 extending between flanges 2 and 2' and defining an axial slot 6, best seen in FIG. 3, which mates in one aspect with channels 8 and 8' disposed respectively, in flanges 2 and 2' for ease in film loading, as will be described later on herein.

Figure 1:
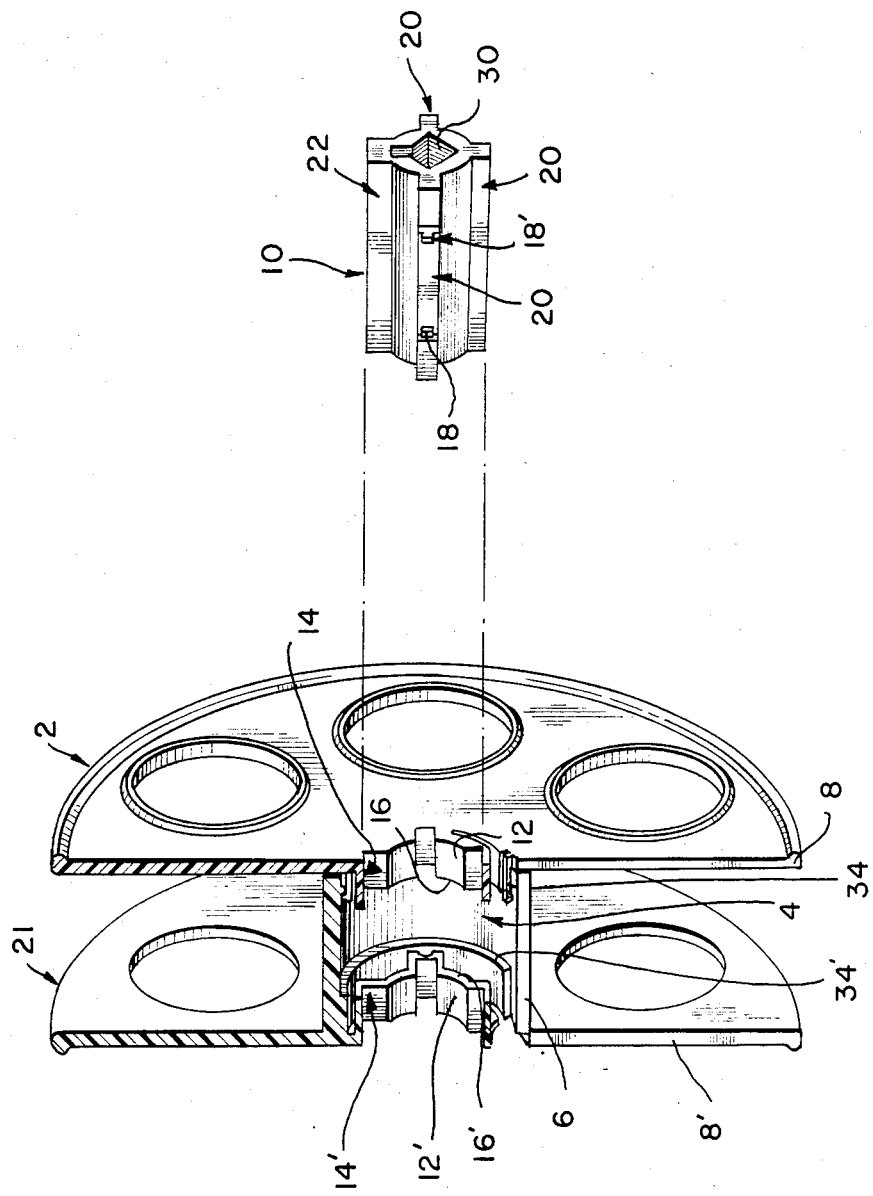
FIG. 1 is partly exploded perspective view partly in section illustrating the primary components of the film reel assembly of the present invention.

A removable core member 10 is shown apart from the remainder of the film reel assembly and is adapted to slidably position coaxially within hub 4 where it is supported by and between flanges 2 and 2'. As shown in FIG. 1, flanges 2 and 2' are provided with axially in- permit core member 10 to releasably lock therebetween.

Figure 3:
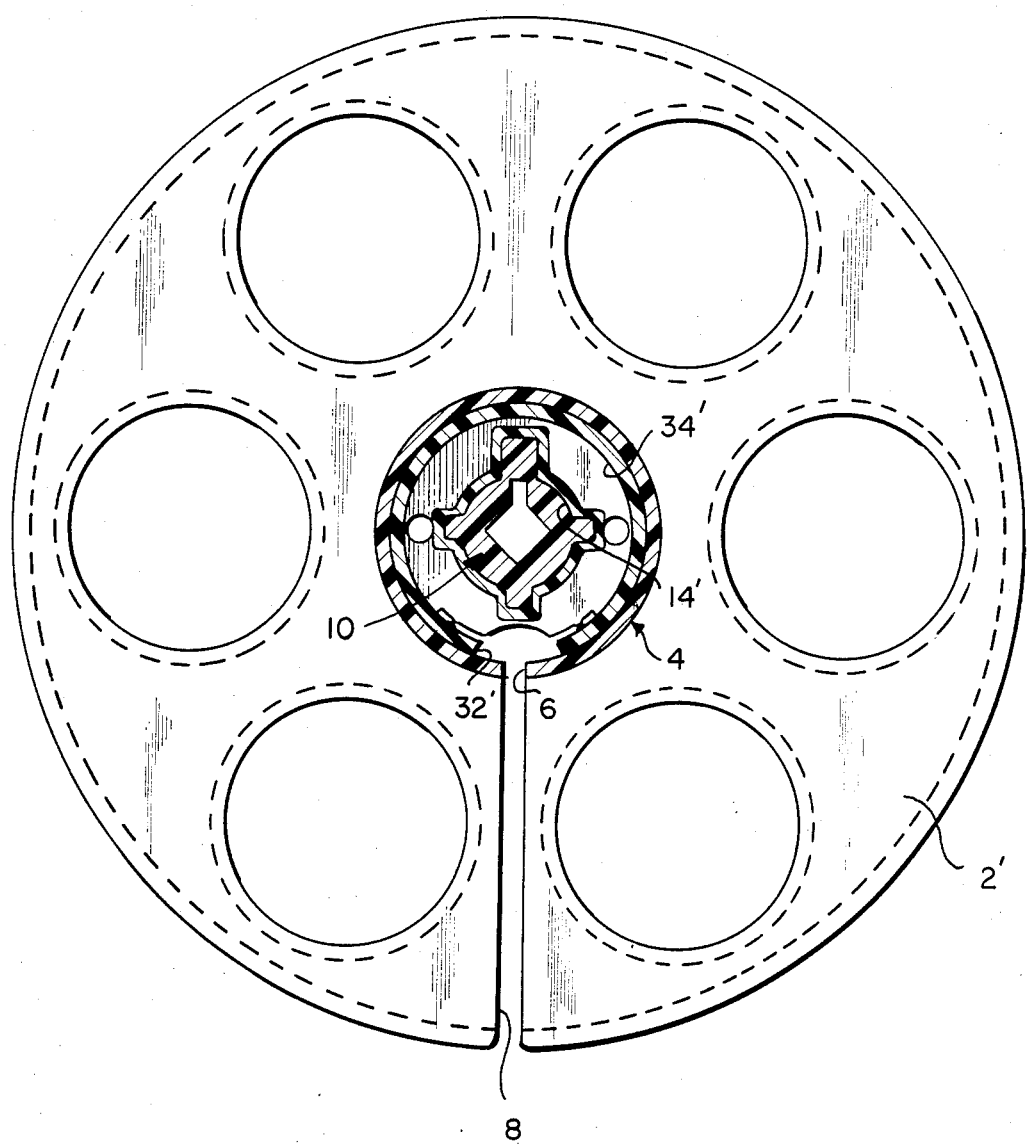
FIG. 3 is a radial side sectional view of the film reel of FIG. 1.

Collars 12 and 12', when viewed in FIG. 3, define keyways 14 and 14' (keyway 14' illustrated in its entirety in FIG. 3), which are disposed in axial alignment with each other and define the channel within which collar 10 is inserted and resides. As mentioned, keyways 14, defined by collars 12, define at their inward axial termini interior lateral edges 16, 16'. Lateral edges 16 and 16' serve as abutments for the locking means disposed on core member 10, to be discussed below.

Figure 4:
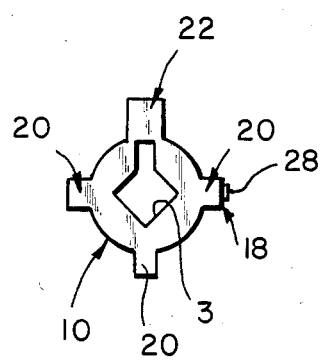
FIG. 4 is an end view of the core member shown in FIG. 1.
Figure 5:
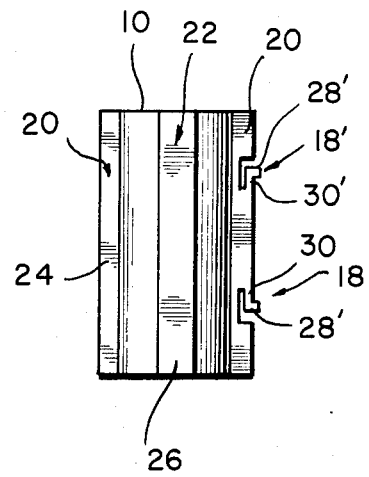
FIG. 5 is a top view of the core member of FIG. 4.

Referring now to FIGS. 4 and 5, core member 10 is shown in greater detail and possesses a generally cylindrical shape defining in cross-section four regularly spaced radiating ridges, each of the ridges defined by three perpendicular flat faces. Three of the ridges 20 are of approximately equal dimension while the fourth ridge 22 is of greater dimension to define a unique cross-section that permits mating with keyways 14, 14' in a singular disposition. Preferably, ridges 20 and 22 have rectangular flat faces such as at 24 and 26 respectively.

Figure 2:
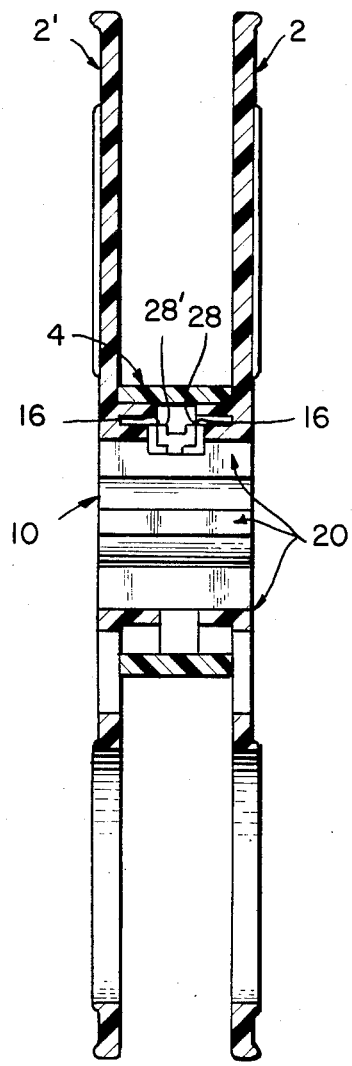
FIG. 2 is an axial side sectional view of the film reel of FIG. 1.

Stops 18 and 18' are better seen in FIG. 5 and comprise cleats or projections 28, 28' that as shown in FIG. 2 may abut the interior lateral edges 16 and 16' to retain core member 10 within keyways 14, 14' as shown. Cleats 28, 28' are capable of inward biasing, as they are mounted on axially extending arms 30, 30'. Thus, cleats 28, 28' may be depressed or simply urged inward by extreme pressure placed against core member 10, to force core member 10 out of keyways 14, 14' when removal of core member 10 is desired. As core member 10 is usually removed when it is in need of replacement, simple axial pressure thereagainst will cause cleats 28, 28' to bias inward to permit core member 10 to be removed.

Referring now to FIG. 3, a further aspect of the present invention is shown therein. Flange 2' as illustrated includes a generally peripherally tapered arcuate slot 32' (corresponding slot 32 understood to reside within flange 2) which may receive and frictionally engage a strip of film during loading thereof. Slots 32, 32' are arcuate and may extend so as to subtend an arc of abut 90°. Slots 32, 32' are tapered at their extremities as shown, and are thereby capable of frictionally engaging and holding a strip of film or other audio-visual medium when threaded therein. The advantages of this construction are obvious as in practice, one simply passes the film strip through channels 8, 8' and axial slot 6, whereupon the leading edge of the film may be directed to either extremity of arcuate slots 32, 32'. Slots 32, 32' are adapted to make peripheral edge contact with the film strip which contact is sufficient to retain the film strip while initial winding of the film about hub 4 is accomplished. Thereafter, and as well known, the securement of the film about hub 4 will itself maintain the film stationary while windup is conducted.

Referring back to FIGS. 1–3, the bulk of the film reel assembly comprising flanges 2, 2' and the hub 4 may be constructed individually and adhesively secured together, or may, if desired, be molded as an integral, one piece construction. In the instance where the flanges 2 and 2' and the hub 4 are individually molded, a hub alignment ring or projection 34, 34' may be provided on each of the interior-facing surfaces of flanges 2 and 2', to of rings 34, 34' is configured to abut with the inner surface of hub 4, so that adhesive disposed interstitially therebetween will effectively secure hub 4 to flanges 2 and 2'.

The film reel assembly of the present invention may be prepared from a variety of well known materials, including suitable lightweight metals and various plastic materials. Plastic materials are generally preferred, because of their non-conductivity, light weight and low cost. Of the plastics useful in accordance with the present invention, the majority of the film reel may be prepared from a number of polyolefins, vinyl polymers, polycarbonates and the like, with illustrative materials comprising polyethylene, polypropylene, A-B-S copolymers, polyvinyl acetate, polyvinyl chloride, and mixtures thereof. Other materials suitable herein comprise polyesters such as polyethylene terephthalate, and suitable polyurethanes.

The core member 10 as shown herein possesses an axial bore 36 which corresponds to the conventional rotating axis of a film projector or the like. Naturally, other cross-sectional configurations may be utilized in the preparation of bore 36.

Core member 10 may be prepared from a variety of materials, and is preferably prepared from highly durable, resilient thermoplastic materials such as reinforced Nylon ®. Naturally, other comparable materials including other polyamides and certain polycarbonates and polyurethanes may also be employed. The present invention is not limited to specific materials utilized but rather encompasses a variety of such suitable materials within its spirit and scope.

As mentioned earlier, one of the advantages of the present invention is the replaceability of the central core member 10. Thus, when it is found that a core member 10 is in need of replacement, simple axial hand pressure may be applied to force the old core member out of the keyways 14, 141. A new core member 10 may then be inserted as by hand pressure applied after the core is positioned on one side of the reel. If desired both cleats may be manually depressed as they make contact with the outer surface of the first keyway to ease the insertion of the new core member.

It is understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A film reel assembly comprising:
   A. generally parallel positioned spaced apart reel flanges,
   B. a cylindrical hollow hub extending between said flanges and having an axial slot for the leading end of a film strip.
   C. a removable core member adapted to be positioned coaxially within said hub, supported by and between said flanges and having an axial bore for engaging a rotating axis,
   D. each of said flanges defining a keyway for the frictional reception of said core member, said keyways axially aligned with each other and having cross-sectional configurations identical and dimensionally complementary to that of said core member, and
   E. stop means disposed for communication between said core member and said keyways to releaseably retain said core member in position with said hub.

2. The film reel assembly of claim 1 wherein said core member has a generally cylindrical shape and defines in cross-section four regularly spaced radiating ridges each of said ridges defined by three perpendicular flat faces, three of said ridges identical in dimension and the fourth ridge larger therein, and said stops comprise radially inwardly biasing arms defining outwardly projecting cleats adapted to releasably abut with the interior lateral edges of said keyways.

3. The film reel assembly of claim 1 wherein said hub comprises a cylindrical sleeve that is adhesively attached to said flanges.

4. The film reel assembly of claim 1 wherein said keyways comprise axially inward projecting collars defined by said flanges, said collars terminating in said interior lateral edges.

5. The film reel assembly of claim 1 wherein said stops are in axial alignment with each other.

6. The film reel assembly of claim 1, wherein said stop means comprises releaseable, biasing stops located on a peripheral surface of said core member and adapted to abut with said keyways at the inboard axial edges thereof.

7. The film reel assembly of claim 1, wherein said assembly includes generally peripherally tapered, arcuate slots located in said flanges in axial alignment with each other and radially inboard of said hub to receive and frictionally retain within said tapered periphery the end of said film inserted through said axial slot.

8. The film reel assembly of claim 7 wherein said arcuate slots subtend an arc of about 90°.

9. The film reel assembly of claim 7 wherein said arcuate slots are disposed with the median point of their arcs adjacent said axial slot.

* * * * *